(12) United States Patent
Nunes, Jr.

(10) Patent No.: US 6,571,543 B1
(45) Date of Patent: Jun. 3, 2003

(54) GRASS FLOW GUIDES

(76) Inventor: John F. Nunes, Jr., 1707 Magnolia Ave., Patterson, CA (US) 95363

( * ) Notice: Subject to any disclaimer, the term of this patent is extended or adjusted under 35 U.S.C. 154(b) by 0 days.

(21) Appl. No.: 09/503,291

(22) Filed: Feb. 14, 2000

(51) Int. Cl.[7] .............................................. A01D 67/00
(52) U.S. Cl. ................................................. 56/320.1
(58) Field of Search ........................... 56/14.7, 16.7, 56/16.8, 17.3, 320.1, 320.2, DIG. 5

(56) References Cited

U.S. PATENT DOCUMENTS

| | | | | |
|---|---|---|---|---|
| 3,646,739 A | * | 3/1972 | Dahl | 56/320.1 |
| 4,361,000 A | * | 11/1982 | Friberg | 56/320.2 |
| 5,457,947 A | * | 10/1995 | Samejima et al. | 56/320.1 |
| 5,488,821 A | * | 2/1996 | McCunn et al. | 56/320.2 |
| 5,765,346 A | * | 6/1998 | Benter et al. | 56/320.1 |

FOREIGN PATENT DOCUMENTS

| | | | | |
|---|---|---|---|---|
| CA | 961276 | * | 1/1975 | 56/320.1 |

* cited by examiner

*Primary Examiner*—Robert E. Pezzuto
*Assistant Examiner*—Nathan Mammen

(57) ABSTRACT

An improved and more efficient means to route air and newly cut grass particles under and around circular lawn mower housings near the ends of the horizontal rotating blade permitting an improved flow of air and grass particles through the use of semicircular baffles concentric to the axis of the rotating blade and extending downward from the circular housing. Two short concentric semicircular baffles are used each of which having slanting portions extending outward and upward from the lowest edge of each baffle to the housing. This slanting portion, is a section of a cone and helps to avoid the accumulation of grass particles on the outer, upper edges of the housing. The result is the creation of a partial laminar flow near the inside surface of the housing and the distribution of the cut grass particles in a fan like pattern behind the lawn mower.

10 Claims, 2 Drawing Sheets

GRASS FLOW GUIDES

FIELD OF INVENTION

This invention relates generally to the field of lawn mowing devices and more particularly to an improved and more efficient means to route air and newly cut grass particles under and around circular lawn mower housings.

The present invention permits the improved flow of grass particles through the use of semicircular baffles concentric to the axis of the rotating blade and extending downward from the bottom of the circular housing.

In the preferred embodiment of the present invention, two short semicircular baffles are used and each has a slanting portion extending outward and upward from the lowest edge of the baffle to the housing. These slanting portions are sections of cones and help to avoid the accumulation of grass particles under the housing and permit a more uniform distribution of the cut grass particles behind the lawn mower.

CROSS-REFERENCE

Bushboom, et al, U.S. Pat. No. 5,987,863

STATEMENT REGARDING THE USE OF FEDERAL FUNDS

No federal funding, direct or indirect, has been utilized in conjunction with the development of the present invention.

STATEMENT REGARDING MICROFICHE RECORDS

No microfiche records are used in the application submitted for the present invention.

PRIOR ART

No prior art can be found which discloses the present invention. There is one example of baffles used to route air and grass particles by Bushboom, U.S. Pat. No. 5,987,863, which has a different purpose of directing the flow upward to a discharge port. The Bushboom patent discloses openings in the baffles near the housing to permit this upper discharge flow. No slanted portion for the baffle is disclosed. No prior art can be found which seeks to manage the flow of air and grass particles using enact semicircular baffles with or without slanted portions. No prior art stresses the importance of creating a laminar flow pattern of air and grass particles just under the housing or the importance of the placement of the baffles to create a fan shaped discharge.

SUMMARY OF THE INVENTION

The present invention permits grass to be cut and distributed in a more efficient manner by providing a more efficient means to route air and newly cut grass particles under and around a circular lawn mower housing and its horizontal rotating blade. This is realized by improving the flow of air and grass particles through the use of semicircular baffles concentric to the axis of the rotating blade and extending downward from the circular housing near its outer inside surface. Another important advantage of this invention is to avoid the creation of rows of cut grass, also called windrows, by uniformly distributing the cut grass in a fan or arc behind the cutting unit.

Two or more short semicircular baffles are used and each has a slanting portion extending outward and upward from the lowest edge of the baffle to the housing. The slanting portion is a section or a cone and helps to avoid the accumulation or grass particles on the outer, lower surface of the housing near and between the baffles.

These and other objects an advantages of the present invention will become clear to those skilled in the art in view of the description of the best presently known mode of carrying out the intention and the applicability of the preferred embodiment as described here in and as illustrated in the several figures of the drawings.

GRASS FLOW GUIDES

Specification
Best Mode for Carrying Out Invention

The best mode for carrying out the present invention are the grass flow guides. The present invention is realized by using one or more semicircular guides mounted under and along the outer surface of a circular lawn mower housing. These are short vertical guides which extend downward about 1 inch from the outer bottom surface of the housing toward the plane of rotation of the cutting blade. The purpose of these guides is to more effectively channel the air under the housing by creating a partial laminar flow under the housing and by ejecting the cut grass toward the rear of the cutting unit in a fan like pattern. To understand the range of applications and the details of implementing the present invention, reference is made to the drawings.

Figure 1:
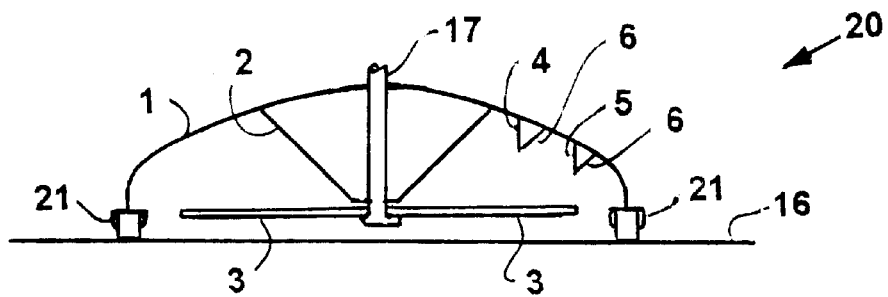
FIG. 1. A sectional rear view through the housing.

Referring particularly to the figures wherein like-referenced numbers have been applied to like-parts throughout the description, FIG. 1 shows a sectional rear view through the housing 1 for a rotary lawn mowing unit which is designated by the general reference number 20. An inverted conic section 2 is shown surrounding and concentric to the drive shaft 17. Two baffles, the inner baffle 4 and the outer baffle 5, are shown along the outer bottom surface of said housing 1 with outward and upward slanting portions 6. Said drive shaft 17 terminates in a horizontally rotating blade 3. Support rollers 21 maintain said housing 1 above the ground 16.

Figure 2:
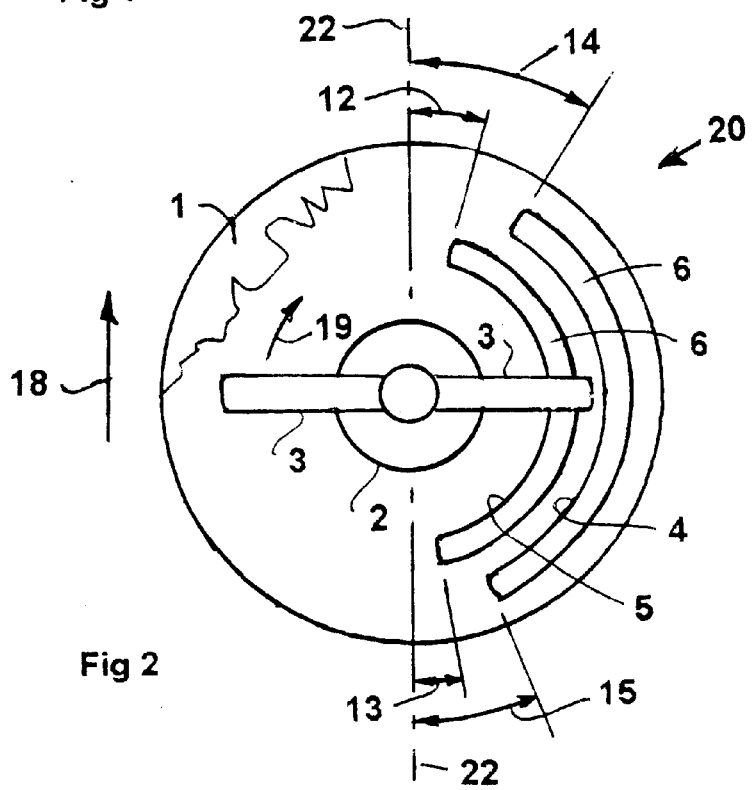
FIG. 2. A bottom view of the housing.

FIG. 2 is a bottom view of the housing 1, said conic section 2 showing said blade 3, said baffles 4,5 and said slanting portions 6. The direction of travel of the cutting unit is shown with the direction arrow 18 and the direction of rotation of the blade 3 is shown by the direction arrow 19. An axial plane 22 passes vertically through said drive shaft 17 and through the housing 1 at the front and rear of the cutting unit 20. Relative to said axial plane 22, the offset of the lead portion of the inner baffle is given by the lead radial angle of the inner baffle 12. Relative to said axial plane, the rear portion of the inner baffle is offset by the rear radial angle of the inner baffle 13. Relative to said axial plane 22, the offset of the lead portion of the outer baffle is given by a lead radial angle of the outer baffle 14 and of the rear portion is given by the rear radial angle of the outer baffle 15. Said lead angles 12,14 can be the same or different and said rear angles 13, 15 can be the same or different. These angles 12, 13, 14 15 affect the shape of the fan of ejected grass.

Figure 3:
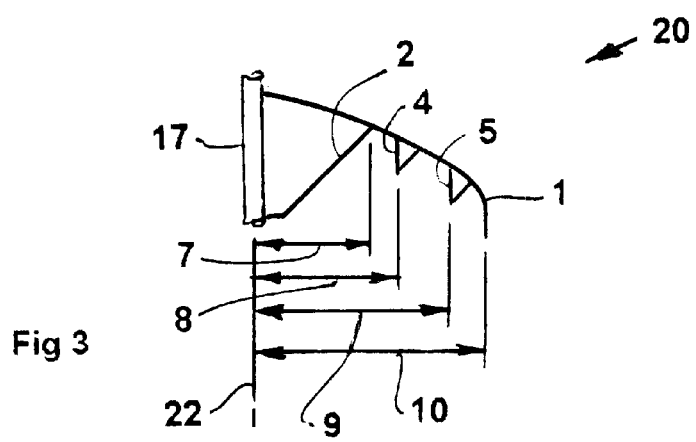
FIG. 3. A sectional rear view through part of the housing.

FIG. 3 shows a cut away rear view through the housing 1 of a cutting unit 20. Shown is said conic section 2, said drive shaft 17 and said inner baffle and outer baffles 4, 5 and their respective slanting portions 6 extending from the lower edge of each baffle 4, 5 outward and upward to the lower surface of said housing 1. The relative spacing of various elements are shown and in particular the horizontal distance from said axial plane 22, said drive shaft 17, to the base of the conic section 2, which is one half of the diameter of the housing 10, is, in the preferred embodiment of the present invention about 5½ inches for a domed housing 1 some 24 inches in diameter. Likewise, for such a configuration, the distance of the outer baffle 5 from said axial plane 22, the outer baffle spacing 9, is about 11 inch. For such a configuration, the distance from the inner baffle 5 to the axial plane 22 to the inner baffle 4, the inner baffle spacing 8, is about 10 inches. The depth of each of said baffles 4, 5 for such a configuration preferably is about one inch.

Figure 4:
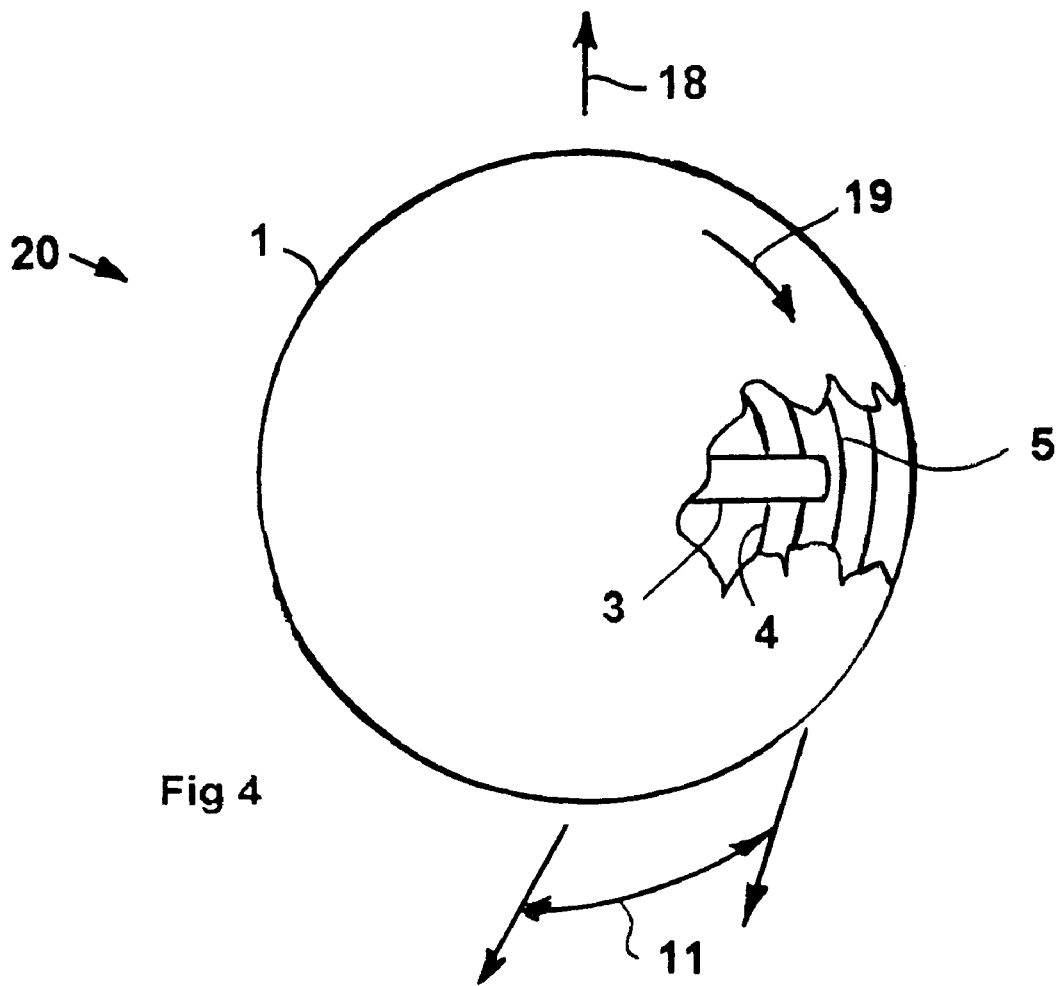
FIG. 4. A cut away plan view of the housing.

FIG. 4 shows a cut away plan view of said housing 1 of said cutting unit 20. Shown is the rotating horizontal rotating blade 3 and said baffles 4, 5 and their outward slanting portions 6. Also shown are the direction arrows 18 for the direction of travel of the cutting unit 20 and the rotation direction arrow 19 for said blade 3. The fan of grass particles elected from the rear of said cutting unit is indicated by the arrow 11.

The manner in which the grass flow guides, termed baffles 4, 5, function is to channel the air and cut grass particles around the lower outer edge of the housing 1 in a manner that creates a partial laminar flow near the surface of the housing 1. The end result, shown by field tests, is that the grass is distributed in a fan like 11 manner behind the cutting unit 20 and that clumping under the housing 1 is avoided. The slanted portions 6 of the baffles 4,5 help to avoid clumping under the housing 1 near of the baffles 4,5.

Thus it has been shown that an improved means for the distribution of grass behind a cutting unit and the avoidance of clumping under the housing has been shown.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

REFERENCE NUMERALS—DESCRIPTION

| Numeral | Description |
| --- | --- |
| 1. | Housing |
| 2. | Conic section |
| 3. | Blade |
| 4. | Inner baffle |
| 5. | Outer baffle |
| 6. | Slanting portion of baffle |
| 7. | Radius, base of cone |
| 8. | Inner baffle spacing |
| 9. | Outer baffle spacing |
| 10. | Housing radius |
| 11. | Arrow indicators of the shape of the fan of ejected grass particles. |
| 12. | Lead radial angle inner baffle |
| 13. | Rear radial angle inner baffle |
| 14. | Lead radial angle outer baffle |
| 15. | Rear radial angle outer baffle |
| 16. | Ground |
| 17. | Drive shaft |
| 18. | Direction arrow for direction of travel |

-continued

| Numeral | Description |
| --- | --- |
|  | for the cutting unit |
| 19. | Direction arrow for direction of rotation of blade |
| 20. | General reference number for a cutting unit |
| 21. | Support roller |
| 22. | Axial plane |

What is claimed is:

1. A lawn mower cover comprised of a domed housing, a powered cutting blade centrally mounted in said housing, ground support means attached to said housing and one or more semicircular vertical baffles affixed to the outer bottom surface of said housing, situated concentric to the center of said housing and located under and to the side of said housing, with respect to the direction of travel of said lawn mower, under which the backward sweep of said blade occurs, each of said vertical baffles also comprised of a sloped surface extending upward and outward from the bottom edge of said vertical baffle to the bottom of said housing.

2. The lawn mower cover as in claim 1 wherein the baffles are comprised of two baffles.

3. The lawn mower cover as in claim 1 wherein the baffles are comprised of two baffles whose point of origin and whose point of termination on and under said housing traverse the same radial arc, as measured from the center of said cutting blade.

4. The lawn mower cover as in claim 1 wherein the baffles are comprised of two baffles whose point of origin and whose point of termination on and under said housing traverse different radial arcs, as measured from the center of said cutting blade.

5. The lawn mower cover as in claim 1 wherein the baffles are comprised of one or more baffles each of which extends a uniform distance downward from said housing to the bottom edge of a baffle.

6. A housing for a lawn mowing apparatus, comprised of a hemispheric cover, rolling means for support for said cover, central axial support for rotating a horizontally powered rotating blade and one or more semicircular vertical fins attached to said housing, concentric to the center of said cover and situated to the side of of said cover at which the backward sweep of said blade occurs, each of said vertical fins also comprised of a sloped surface extending upward and outward from the bottom edge of said vertical fin to the bottom of said hemispheric cover.

7. The hemispheric cover as in claim 6 wherein the fins are comprised of two fins.

8. The hemispheric cover as in claim 6 wherein the fins are comprised of two fins whose point of origin and whose point of termination on and under said hemispheric cover traverse the same radial arc, as measured from the center of said rotating blade.

9. The hemispheric cover as in claim 6 wherein the fins are comprised of two fins whose point of origin and whose point of termination on and under said hemispheric cover traverse different radial arcs, as measured from the center of said rotating blade.

10. The hemispheric cover as in claim 6 wherein the fins are comprised of one or more fins, each of which extends a uniform distance downward from said cover to the bottom of a fin.

* * * * *